United States Patent [19]
Seavey

[11] 3,833,979
[45] Sept. 10, 1974

[54] FEED AND TRIM APPARATUS

[76] Inventor: Robert W. Seavey, 79 Aberdeen Rd., Weston, Mass. 02193

[22] Filed: Aug. 27, 1973

[21] Appl. No.: 391,583

[52] U.S. Cl.................. 29/27 C, 82/2.7, 83/411 R, 83/417, 83/733, 144/48
[51] Int. Cl............................................ B26d 9/00
[58] Field of Search....... 29/27 C; 82/2.7; 83/411 R, 83/417, 733; 144/48; 142/18, 19, 20

[56] References Cited
UNITED STATES PATENTS
| | | | |
|---|---|---|---|
| 1,195,731 | 8/1916 | Rhodes | 144/48 |
| 2,321,735 | 6/1943 | Clifford | 83/411 R |

*Primary Examiner*—J. M. Meister

[57] ABSTRACT

Apparatus for advancing successive longitudinally-extending workpieces from the outlet of a storage hopper into position for engagement by a lathe spindle, the apparatus including a movable feed arm having a recess for engaging an intermediate portion of one of the workpieces, a driver for moving the feed arm in a plane generally perpendicular to the longitudinal axis of a workpiece engaged thereby between a first position wherein the recess is adjacent the hopper outlet and a second position wherein the recess is aligned with the lathe spindle, and a saw blade intermediate the hopper outlet and lathe spindle along the path of movement of the feed arm, the blade being in a plane parallel to the plane of movement of the feed arm and being arranged for cutting an end portion from a workpiece engaged by the feed arm during movement of the feed arm from the first position to the second position.

21 Claims, 7 Drawing Figures

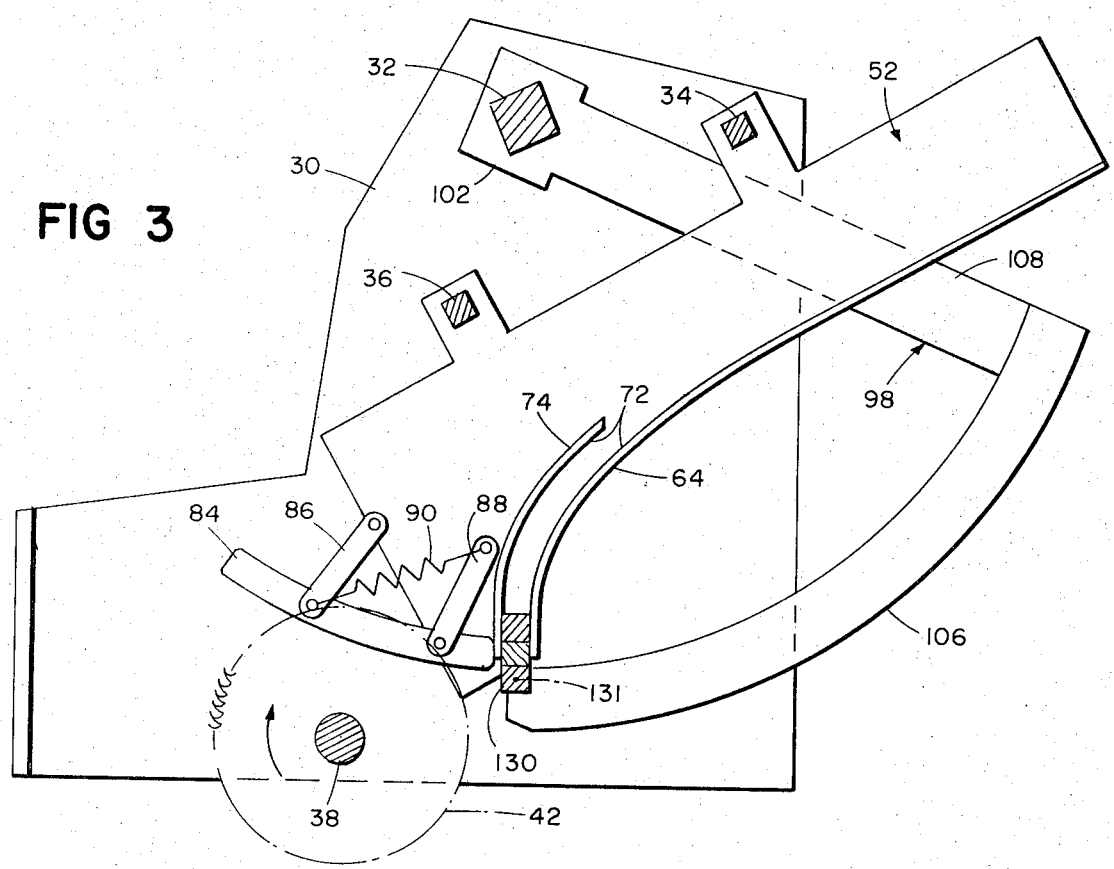
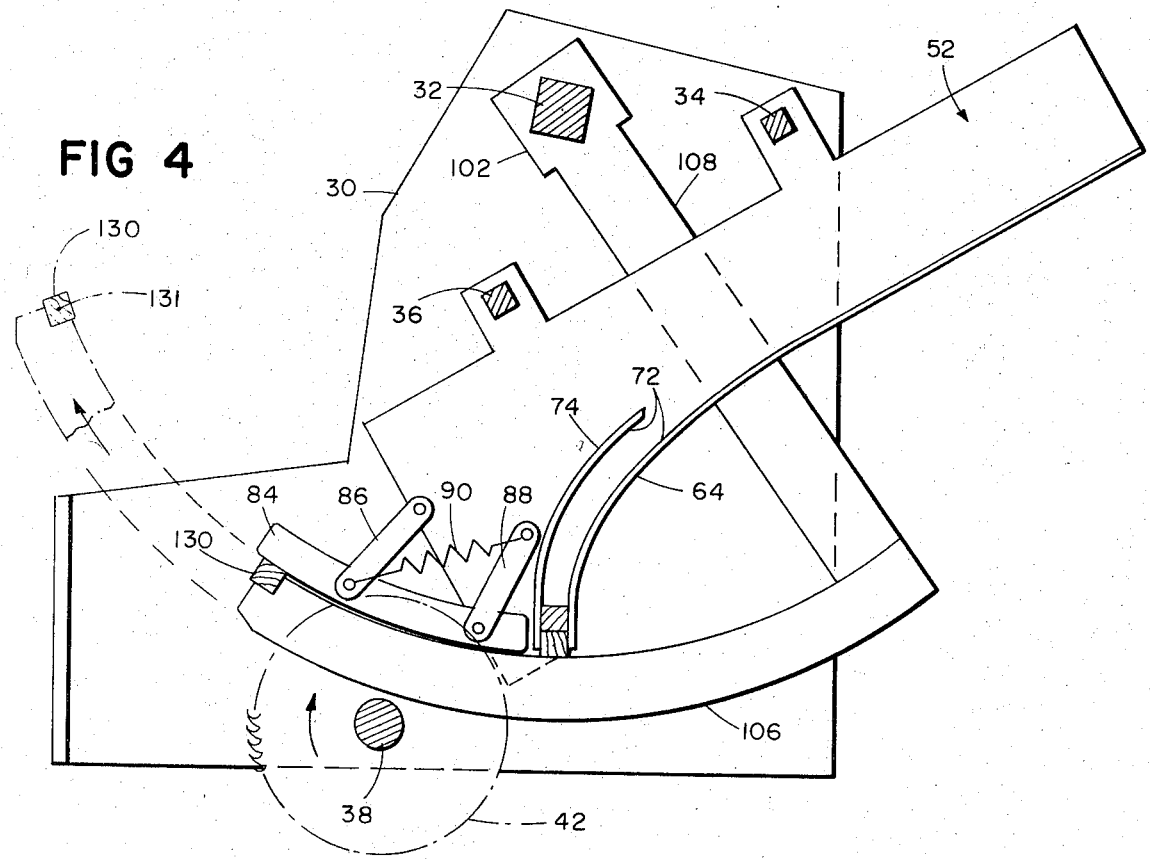

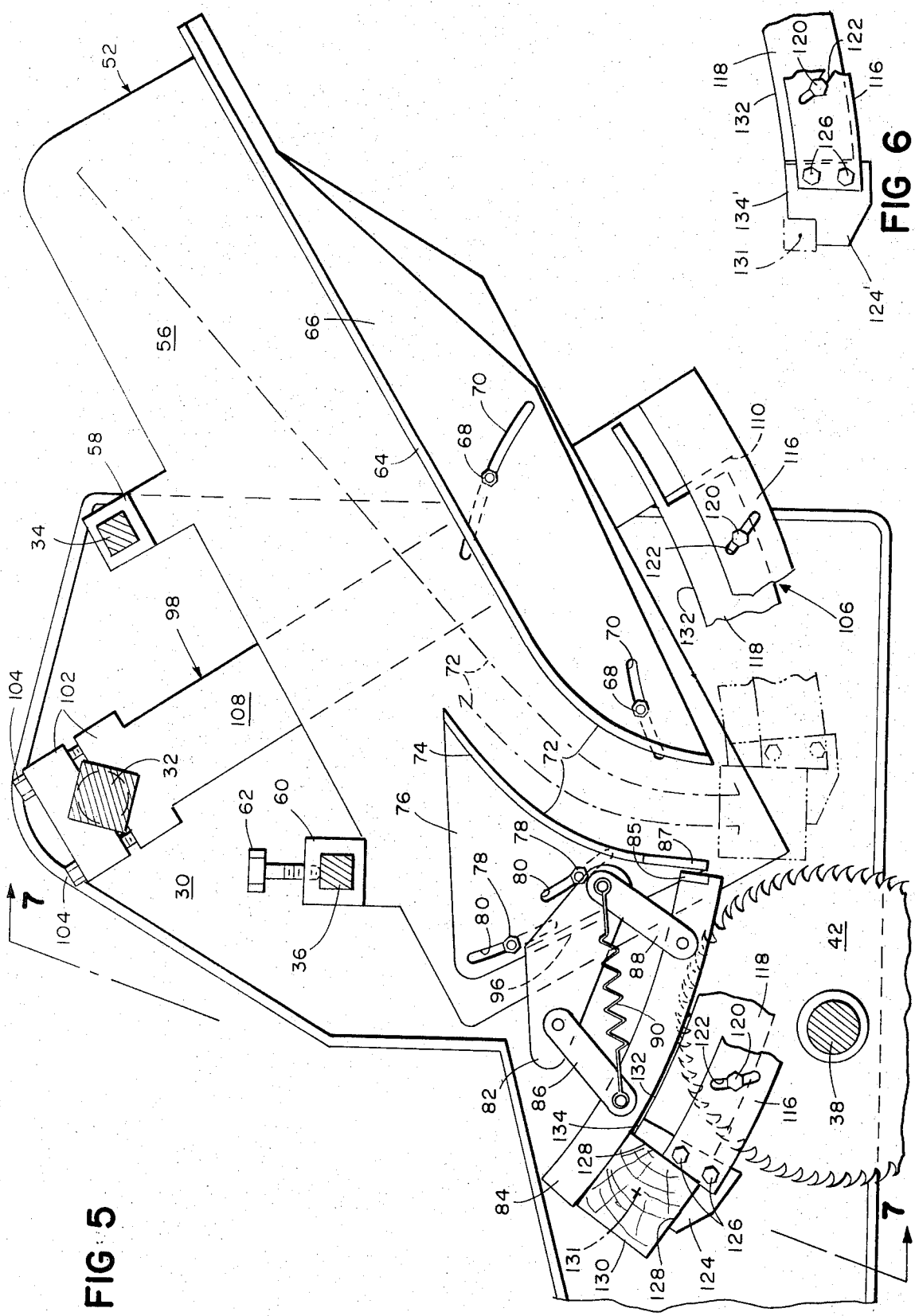

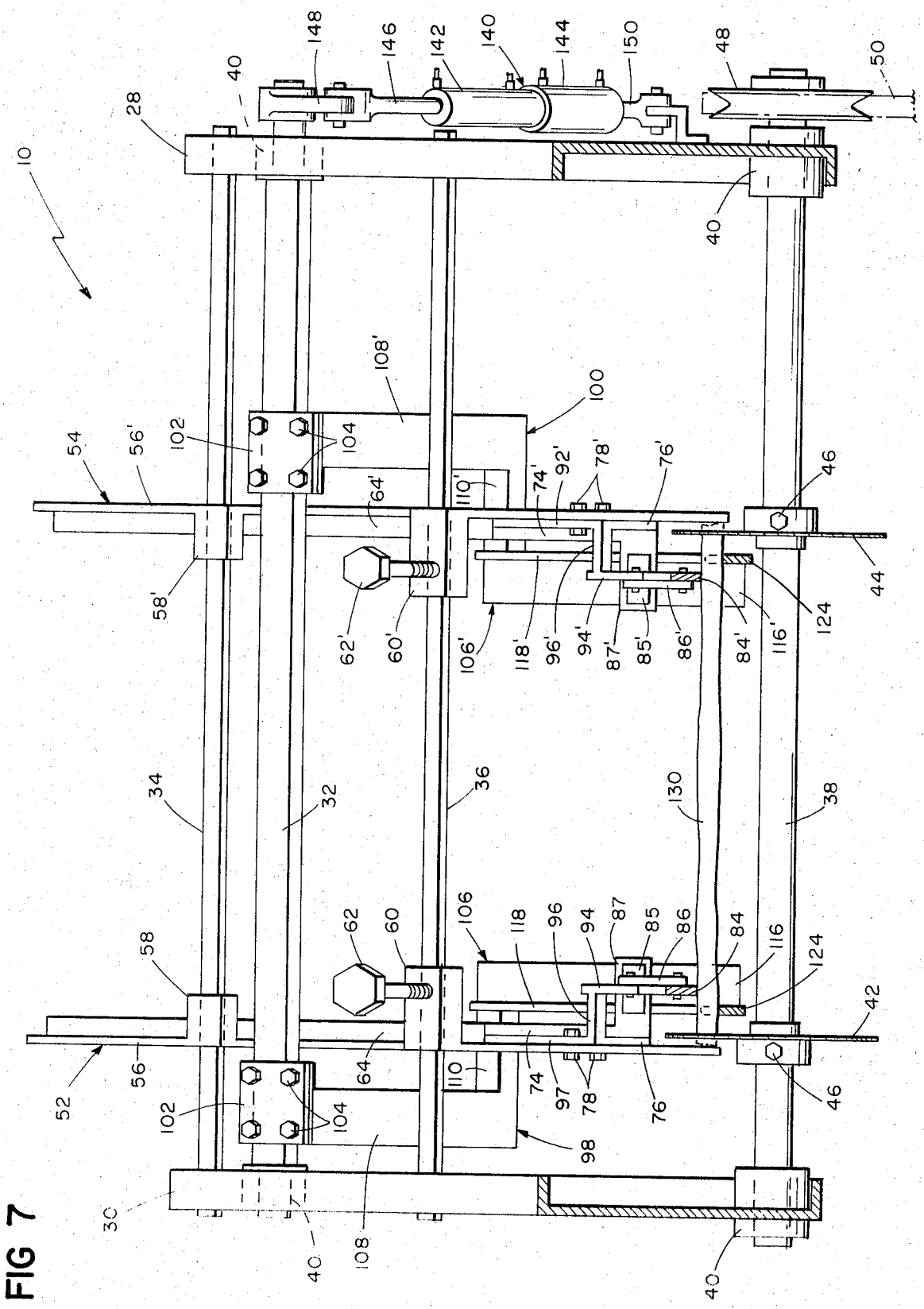

FEED AND TRIM APPARATUS

This invention relates to feeding and, more particularly, to feeding long workpieces from a storage hopper to the spindle of a lathe.

It is a primary object of the present invention to provide apparatus for automatically feeding workpieces, one at a time, from a storage hopper, through a saw for cutting the workpiece to length, and between the spindles of a lathe. Other objects include providing such apparatus in which the workpieces are moved from the hopper outlet horizontally and to the spindle generally vertically upwardly, in which each successive workpiece is trimmed to length and fed into an intermediate position between the saw and lathe while the previous workpiece is being turned, which is adjustable for use with workpieces of widely varying length and diameter, and which may be used with a wide variety of existing lathes.

The invention features apparatus for advancing successive longitudinally-extending workpieces from the outlet of a storage hopper into position for engagement by a lathe spindle, the apparatus including a movable feed arm having a recess for engaging an intermediate portion of one of the workpieces, a driver for moving the feed arm in a plane generally perpendicular to the longitudinal axis of a workpiece engaged thereby between a first position wherein the recess is adjacent the hopper outlet and a second position wherein the recess is aligned with the lathe spindle, and a saw blade intermediate the hopper outlet and lathe spindle along the path of movement of the feed arm, the blade being in a plane parallel to the plane of movement of the feed arm and being arranged for cutting an end portion from a workpiece engaged by the feed arm during movement of the feed arm from the first position to the second position. In preferred embodiments which include a pair of feed arms and saws, there is featured each feed arm including an arcuate portion defining the recess between the saws and a carrier portion exterior to the saws and hopper, a hold down for urging the workpiece into the recess as it is carried by the feed arms through and past the saws, moving the workpiece generally horizontally during its initial movement from the hopper outlet and generally vertically upwardly during its final movement into the second position, and feed arms and hoppers that are adjustable for use with workpieces of widely varying lengths and diameters.

Other objects, features and advantages will appear from the following detailed description of a preferred embodiment of the invention, taken together with the attached drawings, in which:

FIGS. 3 through 5 are plan, somewhat diagrammatic views of portions of the feed and trim apparatus of FIG. 1;

FIG. 6 is a plan view illustrating adjustment of the apparatus of FIG. 5 for use with workpieces of a different size; and, FIG. 7 is a sectional view of the feed and trim apparatus of FIG. 1, taken at 7—7 of FIG. 5.

Figure 1:
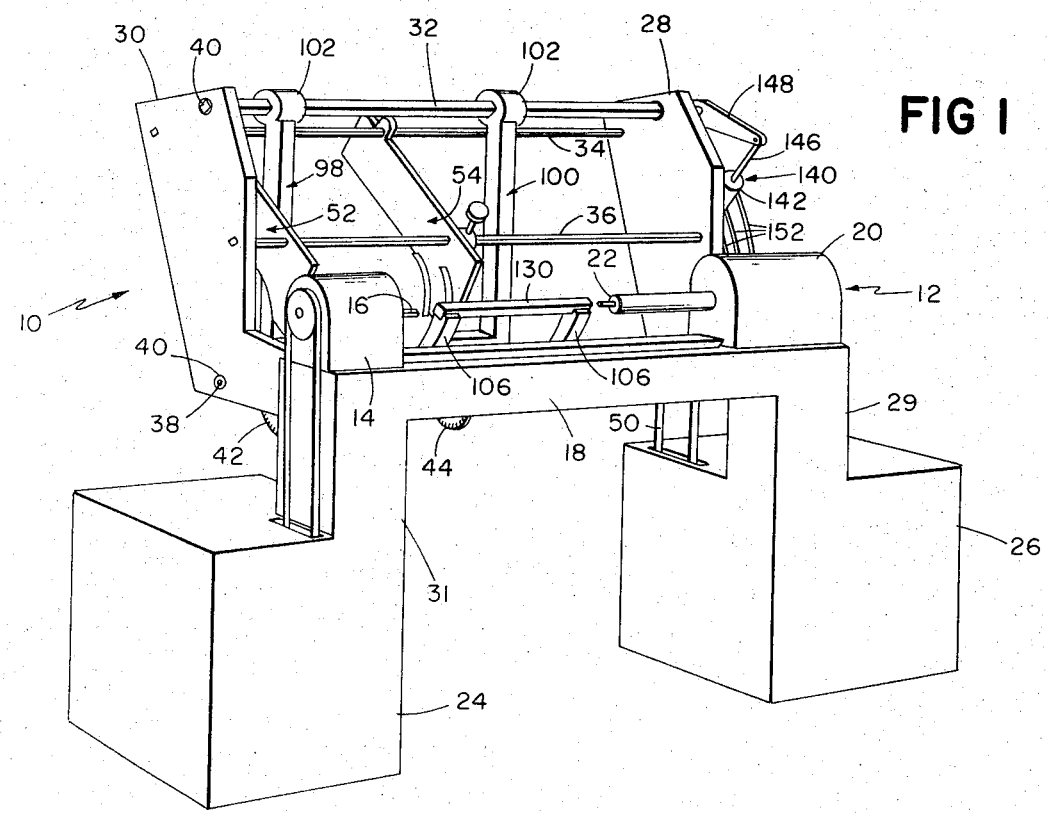
FIGS. 1 and 2 are perspective, somewhat simplified, views of the feed and trim apparatus of the present invention mounted adjacent a wood turning lathe.
Figure 2:
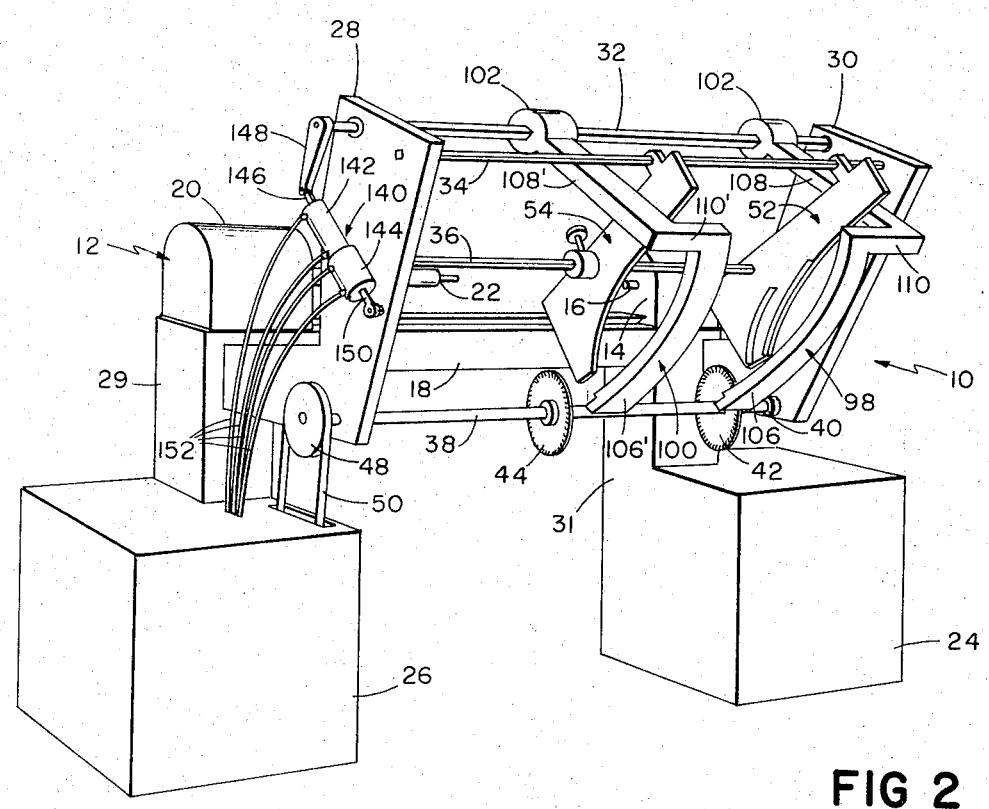

Referring more particularly to the drawings, there is shown a feed and trim system, generally designated 10, attached to a wood turning lathe 12. Lathe 12 is conventional (Model M-6 Back-knife Lathe, manufactured by Seavey, Inc. of Waltham, Mass.) and will be described but briefly. As illustrated, it includes a fixed head stock 14 including a driven spindle 16, a bed 18, and an adjustable tail stock 20 and spindle 22. Spindle 16 is driven by a motor (not shown) in box 24. A control system (not shown) in box 26 moves spindle 16 longitudinally of bed 18 as required.

Feed and trim system 10 includes a pair of support plates 28, 30, secured to the bed 18 at opposite ends of lathe 12. Three square in cross-section tie rods, designated 32, 34, 36, and a saw support rod 38 extend between support plates 28, 30. Rods 34, 36 are fixed to support plates 28, 30. Rods 32, 38 are mounted in bearings 40 for rotation relative to the support plates.

A pair of circular saws 42, 44 are mounted on rod 38. As shown (FIG. 7) each saw is secured to rod 38 by a set screw 46 and thus its exact location on the shaft may be adjusted as desired. A drive pulley 48 is secured to the end of rod 38 adjacent support plate 28. A motor (not shown) in box 26 drives pulley 48 (and hence saws 42, 44) through drive belt 50.

Rods 34, 36 support a hopper for holding the workpieces to be trimmed and fed to lathe 12. The hopper comprises a pair of ends, designated 52, 54 mounted on and adjustable longitudinally of rods 34, 36. Ends 52, 54 are substantial mirror images of each other and only end 52 will be discussed in detail.

As shown most clearly in FIGS. 5 and 7, end 52 comprises a vertical end plate 56 having at its upper edge two support bearings 58, 60. Each support bearing defines a square in cross-section aperature extending perpendicular to end plate 56. Rod 34 passes through bearing 58; rod 36, through bearing 60. A set bolt 62 is threaded through bearing 60 for fixing it, and thus end 52, in position relative to rods 34, 36.

The central portion of the bottom of the hopper is open; the workpieces therein are supported only at their ends. At end 52, the hopper bottom is defined by the generally horizontal portion of a curved plate 64 having a vertical flange 66 adjustably secured to end plate 56 by a pair of bolts 68 passing through respective elongated, slightly curved slots 70 in flange 66.

The lower portion of plate 64 has a substantial vertical component and defines the rear edge of the hopper throat 72. The forward edge of throat 72 is defined by a second curved plate 74 having a vertical flange 76 adjustably secured to end plate 56 by a pair of bolts 78 passing through respective elongated, slightly curved slots 80 in the flange.

A hold-down mechanism including a support 82, are elongated slightly arcuate hold-down 84, a pair of linkages 86, 88 pivotally connected at their respective opposite ends to support 82 and hold-down 84, and a helical spring 90. One end of spring 90 is connected to the end of forward linkage 86 attached to hold-down 84; the other end, to the end of rear linkage 88 attached to support 82. Spring 90 is in tension and biases hold-down 84 downwardly and rearwardly. Cooperating stops 85 at the rear end of hold-down 84 and 87 at the lower end of curved plate 74 limit rearward movement of hold-down 84 so that, when stops 85 and 87 abut each other, the rear end of hold-down 84 is adjacent but does not overlap the bottom of throat 72.

As shown in FIG. 7, support 82 on which hold-down 84 is mounted includes a pair of spaced vertical portions 92, 94 and an intermediate horizontal spacer 96. Vertical portion 92 is welded to curved plate flange 76, exterior of both saw 42 and closely adjacent hopper end 52. The length of spacer 96 is such that vertical portion 92 on which hold-down 84 is mounted is a few inches on the inside (toward end 54) of hopper end 52, and slightly inside saw 42. Similarly, vertical portion 94' and hold-down 84' of the hold-down mechanism attached to end 54, are on the inside of that hopper end and of the associated saw 44.

For feeding workpieces from the hopper to lathe 12, a pair of feed arms, generally designated 98, 100, are mounted on rod 32. A two-piece flange 102 defining a square in cross-section bearing at the upper end of each of arms 98, 100 is slidably mounted on rod 32. Four set bolts 104 extend through each two-piece flange 102 for securing it tightly to rod 32 and thus adjustably fixing the position of the respective arm relative to the rod. Arms 98, 100 are mirror images of each other and only arm 98 will hereinafter be described in detail.

As shown most clearly in FIGS. 3–7, arm 98 includes an arcuate lower arm segment 106 lying in a plane parallel to and between the planes of saws 42, 44, an upper arm segment 108 lying in a plane parallel to that of lower arm segment 106 but on the opposite side of hopper end plate 52, and an intermediate arm segment 110 extending between and welded to upper arm segment 108 and arcuate lower arm segment 106.

Flange 102 which connects arm 98 to rod 32 is provided at the upper end of upper arm segment 108. Intermediate arm segment 110 extends between the lower end of upper arm segment 108 and the rear end of arcuate lower arm segment 106, in a direction generally perpendicular to both of segments 106, 108. The relative orientation of upper arm segment 108 and lower arm segment 106 is such that when (as in FIG. 5) the segments are viewed so as to appear to be coplanar, upper segment 108 extends radially from rod 32 to the rear end of arcuate segment. In fact, as shown in FIG. 7, upper segment 110 is intermediate hopper end 52 and support plate 30, and lower segment 106 is slightly on the inside of saw 42.

Similarly, upper segment 110' of arm 100 is intermediate hopper end 54 and support plate 28, and lower arm segment 108' of arm 110 is slightly on the inside of saw 44.

Referring particularly to FIG. 5, lower arm segment 106 includes a fixed arcuate member 116 welded at its rear end to the inner end of intermediate arm segment 110, an adjustable guide plate 118 secured to member 116 by bolts 120 extending through slots 122 in guide plate 118, and a tip 124 bolted to the forward end of curved member by bolts 126. A rectangular recess or cut-out 128 is provided in the forward upper corner of tip 124 for receiving a workpiece 130. Guide plate 118 is positioned so that its upper edge 132 is aligned with the upper edge 134 of tip 124.

As shown in FIGS. 5 and 6, the design of the tip 124 and of the recess 128 therein will vary according to the size of the workpiece to be transported from the hopper to the lathe. For a workpiece of any particular size, a proper tip has a recess of such depth that the top of the workpiece will be roughly aligned with the top edge 134 of the tip when the workpiece 130 is supported in the recess. No matter what the size of the workpiece, however, the location of the center 131 of the workpiece carried thereby must be the same so that, when the workpiece is fed into lathe 12, center 131 will be properly aligned with spindles 16, 22. Recesses 128 and the location of the holes for bolts 126 of the different tips are thus designed so that when the tips are mounted on arms 98, 100, the location of the workpiece center (and also roughly that of the center of the tip recess 128) relative to the arms is constant.

To provide the desired constant center, and also the necessary support for the workpieces, the overall height of the various tips differ. For example, the upper surface 134 of tip 124 (for a large workpiece) is higher than that 134' of a tip 124' for a small workpiece. Guide plate 118 is accordingly vertically adjusted relative to arcuate member 116, after the tip 124 of proper size has been attached.

The width of throat 72 also depends on the size of the particular workpiece. As illustrated in FIG. 5, plates 64, 74 can be adjusted relative to end plate 56 to provide a throat widely differing widths, varying from a narrow throat (phantom lines) to a wide throat (shown in solid lines). The length of slots 70 limits the extent of throat width variation. The slots 70 are arranged so that, no matter how wide the throat, its width is substantially uniform throughout its length.

For moving arms 98, 100, a hydraulic actuator 140, including a pair of back-to-back cylinders 142, 144, is mounted on end 28. The end of piston 146 of cylinder 142 is pivotally connected to a lever arm 148 mounted on the end of rod 32. The piston 150 of cylinder 144 is pivotally secured to support plate 28. Hydraulic lines 152 extend from actuator 140 to a control system in box 26. When the actuator 140 is extended and contracted, rod 32 is rotated to move arms 98, 100, between a first position (shown in FIG. 3 and in phantom in FIG. 5 in which tips 124 are directly below throat 72), an intermediate position (shown in solid lines in FIGS. 4 and 5 in which tips 124 are below the forward end of hold-down 84) and a third position (shown in FIG. 1 and in phantom lines in FIG. 4, in which the center of the tip recesses and center 131 of the workpiece are aligned with the spindles of lathe 12).

In operation, the size (length and diameter) workpiece to be turned on lathe 12 is selected. Adjustments are made to hopper ends 52, 54 on rods 34, 36 so that the workpieces fit therebetween; curved plates 62, 64, on ends 52, 54 so that throat 72 has a uniform width slightly greater than the workpiece diameter; saws 42, 44, on rod 38 for trimming workpieces passed through them to the proper length; and to arms 98, 100 on rod 32 so that their arcuate lower segments 106, 106' will pass slightly on the inside of, respectively, saws 42, 44. The proper tips 124 are mounted on arms 98, 100; guides 118 and throat 72 are adjusted as previously discussed, and lathe 12 is set up in the conventional manner.

An operating sequence begins with arms 98, 100 in their first position, shown in FIG. 3. With the arms in this position, the workpiece 130 at the bottom of throat 72 falls from the hopper into recesses 128 at the front of the arms. Cylinder 142 of actuator 140 is then actuated (by the controller in box 26) to rotate rod 32 and swing arms 98, 100 (simultaneously and in unison) forward toward the second position. As the workpiece in recesses 128 moves forward of the bottom of hopper throat 72, the upper edges 132 of guide plates 118 engage the bottom of the next workpiece in throat 72 and prevent it from dropping downwardly.

Expansion of cylinder 142 pivots rod 32 the number of degrees required to advance arms 98, 100 from their first position to the intermediate position (solid lines, FIGS. 4 and 5). This movement of the arms carries the workpiece through saws 42, 44 (which rotate in a clockwise direction as viewed in FIGS. 3-5) and trim it to length. Holddowns 84 engage the top of the workpiece as soon as it moves away from throat 72, and bear downwardly and rearwardly against the workpiece during its movement through and beyond the saws and into the intermediate position. The holddowns continue to engage the workpiece in the intermediate position and prevent machine vibration from shifting the trimmed workpiece's position relative to, or disloding it from, arms 98, 100.

In practice, arms 98, 100 remain in the intermediate position until the previous workpiece has been completely turned and removed from lathe 12. Cylinder 144 of actuator 140 is then actuated to rotate rod 32 a second time and move arms 98, 100 into the second position (FIG. 1; phantom lines, FIG. 4) in which the workpiece is axially aligned with the spindles of lathe 12. It should be noted that during the final portion of its travel into alignment with the lathe spindles, workpiece 130 is moving substantially vertically upwardly. By far the major component of its movement is upwardly; only a minor component is in the forward direction.

As soon as arms 98, 100 reached their second position, the controller in box immediately reverses both cylinders of actuator 140, rotating rod 32 in the other direction and moving the arms back to their first position to begin the operating sequence anew.

The complementary operating sequence of lathe 12 is conventional and need be described only to the extent it relates to that of feed and trim system 10. Both spindles, 16 and 22, are axially movable on bed 18. The lathe control system, also in box 26, moves them axially together to engage a workpiece to be turned, and pulls them axially apart after turning has been completed. The distance of, and time required for, spindle movement is quite short.

The control systems of lathe 12 and feed and time system 10 are interconnected so that spindles 16, 22 will engage a workpiece as soon as arms 98, 100 move it into alignment with the spindles. Then, after turning is complete and the turned workpiece discharged from between the spindles (by a conventional ejector, not shown), the lathe control system actuates the feed and trim system to cause the next workpiece (which has been received from the hopper, trimmed and moved into the intermediate position during turning of the previous workpiece) to be advanced between the spindles. In most wood turning operations, this entire feed, trim and turn process is repeated several times a minute.

Other embodiments within the scope of the following claims will occur to those skilled in the art.

What is claimed is:

1. Apparatus for advancing successive longitudinally-extending workpieces from the outlet of a storage hopper into position for engagement by the spindle of a lathe, said apparatus comprising:
    a movable feed arm having a recess sized and adapted for receiving and engaging an intermediate portion of one of said workpieces;
    a feed arm driver for moving said feed arm in a plane generally perpendicular to the longitudinal axis of a workpiece engaged thereby between a first position wherein said recess is positioned adjacent said hopper outlet and a second position wherein said recess is aligned with said lathe spindle; and,
    a saw blade positioned intermediate said hopper outlet and said lathe spindle along the path of movement of said feed arm, said blade being in a plane generally parallel to said plane of movement of said feed arm and being arranged for cutting an end portion from a workpiece engaged by said feed arm during movement of said feed arm from said first position to said second position.

2. The apparatus of claim 1 wherein said feed arm includes an arcuate portion having said recess at one end thereof and a support portion secured to said arcuate portion at a point spaced from said recess and extending generally radially of said arcuate portion, said feed arm being supported for pivotal movement about an axis generally perpendicular to the planes of said arcuate and support portions, said axis intersecting said support portion at a point spaced from said arcuate portion.

3. The apparatus of claim 2 wherein said support portion is secured to the end of said arcuate portion opposite said recess, the end of said support portion opposite said arcuate portion engages a generally rectangular in cross-section support, and said support is rotatable about the axis thereof for moving said feed arm.

4. The apparatus of claim 1 wherein the major component of movement of said recess during initial movement thereof from said first position is horizontal and the major component of movement of said recess during final movement thereof into said second position is vertically upward.

5. The apparatus of claim 4 wherein said recess moves along a generally arcuate path subtending an arc of not less than about 60°.

6. The apparatus of claim 1 wherein said saw blade is circular and is rotated about the axis thereof for cutting said workpiece, and including a hold-down mechanism for urging said workpiece into said recess during movement of said workpiece past said blade and to an intermediate position on the side of said saw blade opposite said hopper outlet.

7. The apparatus of claim 6 wherein said hold-down mechanism includes an elongated hold-down extending generally parallel to the path of movement of said workpiece past said blade to said intermediate position, a pair of spaced linkages each pivotally connected at one end thereof to said hold-down and at the other end thereof to a support, and a spring biasing said hold-down in a direction generally opposite to the direction of movement of said workpiece past said blade.

8. The apparatus of claim 7 wherein said holddown extends from adjacent said hopper outlet to said intermediate position.

9. The apparatus of claim 1 wherein said hopper includes a pair of parallel spaced end plates defining the opposite ends thereof, said plates being adjustable toward and away from each other for varying the length of said hopper, and a pair of curved plates extending perpendicularly inwardly from and adjustably mounted on each of said end plates, said curved plates cooperating to define an outlet throat of uniform width extending upwardly from said hopper outlet, said curved plates being adjustable relative to each other for varying the uniform width of said throat.

10. The apparatus of claim 9 wherein one of said curved plates defines a portion of the bottom of said hopper in addition to defining said throat.

11. The apparatus of claim 9 wherein each of said curved plates includes a flange extending generally parallel to and engaging the respective adjacent end plate, a pair of spaced slightly curved slots extend through each of said flanges, and said curved plates are secured to said end plates by bolts passing through said slots, said slots permitting said adjustment of said curved plates relative to said end plates.

12. The apparatus of claim 1 wherein said feed arm includes a longitudinally-extending member having a tip removably secured to one end thereof and an adjustable guide plate extending along said member from said tip, said recess being defined by said tip, said tip defining an upper surface extending generally toward said guide plate from said recess, and said guide plate having an upper surface extending generally longitudinally of said member and being adjustable relative to said member in a direction generally perpendicular to said guide plate upper surface.

13. The apparatus of claim 12 including a second carrier tip adapted for attachment to said member in lieu of said first-mentioned carrier tip, said second carrier tip defining a said recess of different size than the said recess defined by said first mentioned recess, but the centers of said recesses being substantially identically located relative to said member when the respective carrier tips are mounted on said member.

14. The apparatus of claim 1 wherein said feed arm includes a first portion defining said recess and a second portion spaced from said first portion, said first portion moving in a plane on one side of the plane of said saw and said second portion moving in a plane on the other side of said saw.

15. The apparatus of claim 1 including a second said feed arm and a second said saw blade, said feed arm driver moving each of said feed arms simultaneously between the respective first and second positions thereof.

16. The apparatus of claim 15 wherein each of said feed arms includes a first portion defining a said recess, a second portion lying in a plane generally parallel to that of said first portion but spaced therefrom, and an intermediate portion connecting said first and second portions, each of said saw blades being in a respective plane generally parallel to and intermediate the planes of movement of the first and second portions of a respective feed arm.

17. The apparatus of claim 16 wherein each of said first portions is arcuate, each of said second portions extends generally radially of a respective first portion, and each of said intermediate portions connects an end of a said second portion to the end of a said first portion opposite a said recess.

18. The apparatus of claim 17 wherein feed arms are arranged to receive a workpiece at said hopper outlet, engage respective longitudinally spaced apart portions of said workpiece, and transport said workpiece generally perpendicularly to the axis thereof from said outlet and past said saws into a position for turning wherein the axis of said workpiece is substantially aligned with the axis of said spindle, said recesses passing intermediate said saws and said saws cutting portions of said workpiece between said respective longitudinally spaced apart portions and the ends of said workpieces.

19. The apparatus of claim 18 wherein said feed arms advance said workpiece from said outlet in a generally horizontal direction, and advance said workpiece into said position for turning in a generally vertically upward direction.

20. The apparatus of claim 18 wherein including a control system for causing said driver first to move said feed arms for advancing said workpiece from a first position adjacent said hopper outlet to an intermediate position on the side of said saws opposite said hopper outlet, second to stop said feed arms for maintaining said workpiece in said intermediate position until the proceeding workpiece has been moved out of engagement with said lathe, and thereafter again to move said arms to advance said workpiece engaged thereby into said position for turning.

21. The apparatus of claim 20 wherein said controller includes a double cylinder and means for actuating a first portion of said cylinder to move arms and advance said workpiece from first position to said intermediate position and for subsequently actuating a second portion of said cylinder to move said workpiece from said intermediate position to said position for turning.

* * * * *